Aug. 15, 1961 R. H. RIEDEL 2,995,809
APPARATUS FOR ASSEMBLING A PORTION OF A BALL BEARING
Original Filed March 9, 1953 2 Sheets-Sheet 1
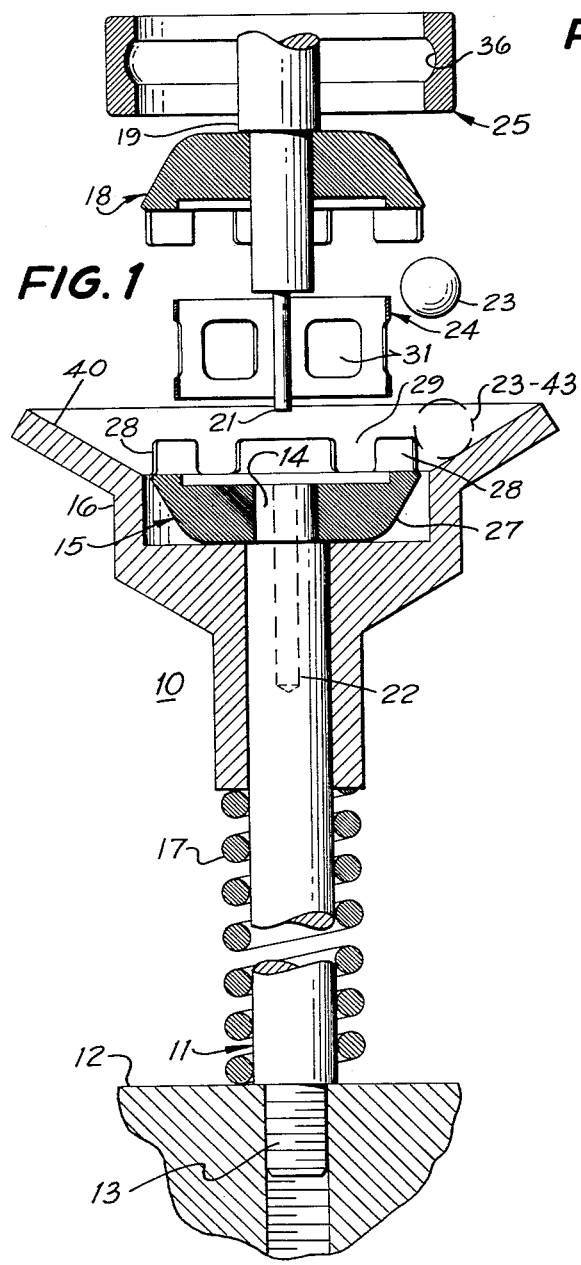
FIG. 1
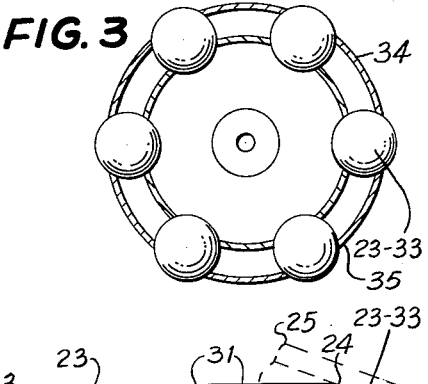
FIG. 3
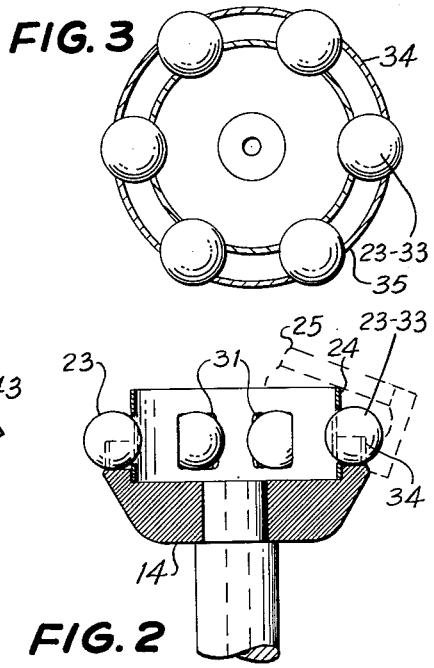
FIG. 2
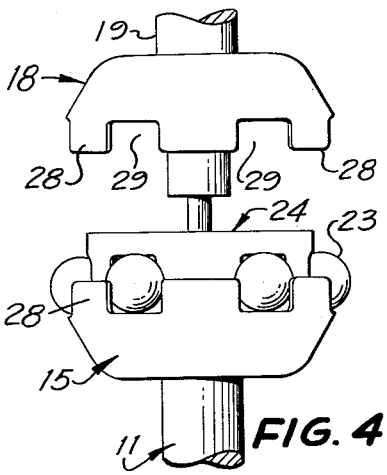
FIG. 4
RICHARD H. REIDEL
INVENTOR.
ATTORNEY Aug. 15, 1961 R. H. RIEDEL 2,995,809
APPARATUS FOR ASSEMBLING A PORTION OF A BALL BEARING
Original Filed March 9, 1953 2 Sheets-Sheet 2

RICHARD H. RIEDEL
INVENTOR.

ATTORNEY

United States Patent Office 2,995,809
Patented Aug. 15, 1961

2,995,809
APPARATUS FOR ASSEMBLING A PORTION OF A BALL BEARING
Richard H. Riedel, Packanack Lake, N.J., assignor to General Precision, Inc., a corporation of Delaware
Original application Mar. 9, 1953, Ser. No. 340,967. Divided and this application Nov. 26, 1957, Ser. No. 703,232
4 Claims. (Cl. 29—201)

This invention relates to a ball bearing, and particularly to a small ball bearing suitable for uses requiring minimum dimensions with maximum accuracy, such as in small gyroscopic instruments.

One object of this invention is to provide a novel apparatus for assembling for such a bearing, in which the bearing balls and one race of the bearing may be assembled with a separator to constitute a sub-assembly that may be handled as a unit, until such sub-assembly is operatively positioned onto the other race upon which the bearing balls are to roll.

A further object of the invention is to provide a ball bearing with a separator of considerable strength and with a substantial degree of resiliency, and disposed concentrically with respect to the axis of rotation of the bearing, in such manner as to take up a minimum amount of space in a radial direction between the two associated races of the bearing, transverse to the axis of rotation, as well as an apparatus for assembling the separator ring to the balls and outer race of the bearing as a sub-assembly.

Another object of this invention is to provide an apparatus for assembling a portion of a ball bearing including a separator that is concentrically disposed with respect to the axis of rotation and that is supported on the bearing balls to locate and define the pressure and reaction forces between the separator and the bearing balls on the locus of a pitch circle.

A major problem arises in the assembling of such a small bearing, during manufacture, due to the fact that the parts of the bearing, particularly the balls, are usually so small as to require handling with tweezers, and easily drop from an operator's hand, or from such tweezers.

Other objects of this invention are to provide a suitable method of assembling the bearing of this invention, and to provide a simple apparatus for permitting quick and easy assembly of such ball bearings, notwithstanding the very small dimensions of the component parts.

An important feature of the bearing of this invention is that the construction and design of the bearing enable the separator to serve as a spacing retainer for the balls during assembling of the bearing.

A particularly important feature is that the separator then serves to hold the bearing balls against one race as an assemblage that can be handled as a unit, before assembly of the bearing on the associated race. Thus, in such assemblage the balls are held against one race, here illustrated as the outer race, by the separator in such manner that the separator constitutes a cage or retainer for holding the balls in position against falling out, in the manner of an auxiliary inner race.

The separator consists of a thin cylinder provided with windows equi-angularly spaced. These windows have each transverse dimension, both width and height, less than the diameter of the bearing ball to be accommodated, and thus each window holds its corresponding bearing ball against movement through the window. The separator is formed as a short thin cylinder, from a material having inherent resiliency, such as steel or surface-hardened aluminum. The resiliency permits simple distorting manipulation of the separator ring during the assembling operation of the outer race over the bearing balls while the balls are retained by the separator. Once this assembly has been made, of the outer race, the balls and the separator, such assembly may be handled as a unit, by holding and manipulating the outer race, as for wrapping, or for storage, or for assembly on the co-operating race. The separator will retain the bearing balls in position in the raceway against undesired displacement from the raceway, during such handling and until assembled on the co-operating race.

The jig, or apparatus, for assembling such small bearing, is also an important feature of this invention, and includes a small cage for holding a separator as a retainer and its group of bearing balls in proper related position until an associated race may be assembled over and around the balls. A saucer-shaped shell beneath the cage serves to catch and save any of the small bearing balls that may fall out of the cage or out of proper position in the retainer, during the assembly operation. Once the cage is suitably closed the balls are held against displacement while a race is forced over the balls.

During the application of the race over the balls, the important feature of the resiliency and construction of the separator is utilized to permit each ball to press and distort the separator or retainer at each window radially inward toward the bearing axis of rotation to enable the race to slip over the bearing balls.

After the race is applied, the resiliency of the separator forces the bearing balls into the raceway of the race. The race and the separator now hold the balls in position as an assemblage and the race can then be manipulated and lifted off the jig with the assemblage of separator and balls as a subassembly of a small bearing.

The construction of the bearing, and the manner in which it may be assembled, and the construction and operation of the jig for assembling the bearing, may be more readily understood upon reference to the accompanying drawings in which:

FIGURE 1 is a side view, partially in elevation and partially in section, of an assembly jig, with the parts of a small ball bearing indicated in progressive assembly positions relative to the jig;

FIGURE 2 is a side view, partially in elevation and partially in section, showing how a separator and several of its associated bearing balls are supported in their normal related positions on the lower cage of the assembly jig before the application of the outer race to form the assemblage;

FIGURE 3 is a plan view of the cage and separator in in the FIG. 2 assembly, and illustrates how the balls are held in position between the outer arcuate ring portions of the cage and the windows of the separator ring, the separator ring engaging the bearing balls below the equatorial pitch circle of these bearing balls;

FIGURE 4 is a side elevational view of a separator and the bearing balls in the lower element of the cage in FIG. 2, with the upper element of the cage in upper position ready to be lowered and applied to close the cage to hold the bearing balls against undesired displacement;

Figure 6:
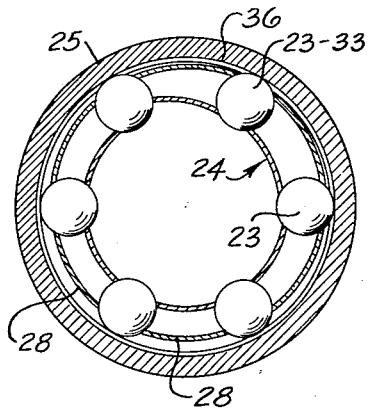
Figure 7:
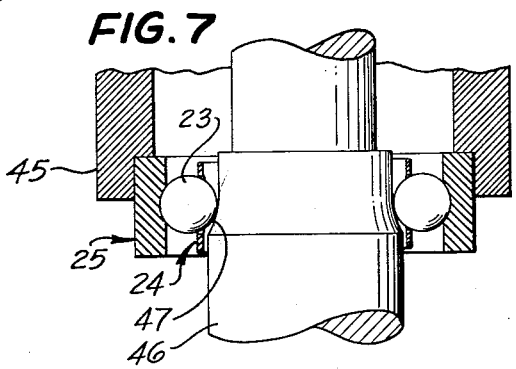
Figure 8:
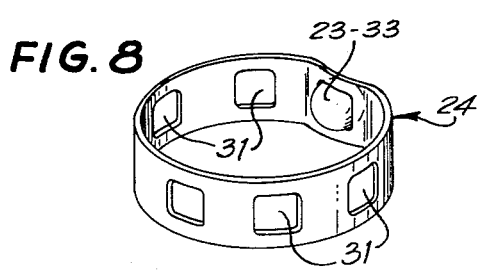
Figure 9:
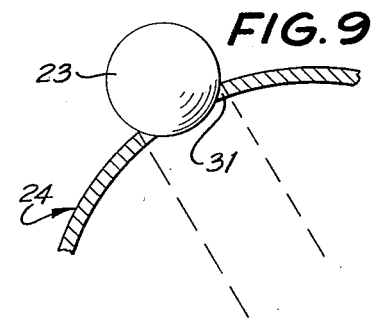

FIGURE 6 is a plan view of the bearing elements illustrating the manner in which the outer race, during assembly, applies a centripetal radial distorting pressure on one or more of the balls to distort and bend the separator sufficiently in a radial direction, adjacent each ball window, to permit the corresponding balls to move radially inward so the outer race can be moved down to embrace the balls and to position them in the groove or raceway of the race;

FIGURE 7 is a side view, partially in elevation and partially in section, showing the manner in which an assembled race and separator are moved co-axially into position on an inner race formed on a shaft for the bearing;

FIGURE 8 is a perspective view of a separator, with the inward bulging distortion formed by one ball at its window in response to pressure applied by an outer race during assembly on the balls; and FIGURE 9 is a schematic plan view illustrating the manner in which the window edge is rounded in the separator to eliminate a sharp edge at one of the bearing balls.

The construction and design of the bearing, and the manner of its assembly may best be illustrated by first considering the construction and manner of operation of the jig, and the manner in which the jig is operated to assemble a bearing of this invention.

As shown in the drawings, a jig 10 comprises a vertical standard 11, threaded into and anchored in a heavy base 12 to hold the standard 11 rigidly supported in stable vertical position. The standard 11 is preferably tubular with a threaded extension 13 at its lower end threaded into the base 12, and with a coaxial extension 14 at its upper end, having a cup 15 press-fitted onto the extension 14 to be rigidly and permanently secured to the top of the standard 11. A shell 16 is disposed concentrically around the standard 11, for free sliding reciprocating movement along the upper end of the standard 11, and the shell 16 is biassed normally to its upper terminal position, by a helical compression spring 17, to seat against the under surface of the cup 15 fixed to the extension 14.

A top closure cup or cage 18, generally similar in all respects and dimensions to bottom cup or cage 15 is securely mounted or pinned on a handle 19, to permit the top cage 18 to be positioned down against the fixed cage 15 for an assembly operation, and to be removed upon the completion of the assembly operation.

In order to enable the top cage 18 to be readily positioned in proper location, a positioning or guide pin 21 is secured coaxially into the underside of the handle 19 and depends downward from the underside of the top cage 18. A center coaxial bore 22 in the upper end of the vertical standard 11 is provided to receive and guide the positioning pin 21 in proper co-axial movement to place the two cage parts 15 and 18 in closing position to hold the bearing balls 23 against a separator 24 until an outer race 25 may be fitted over the balls for assemblage.

The bottom cup or cage 15 embodies a solid base 27 and a plurality of arcuate rim sections 28 vertically upstanding from the base. The arcuate segments 28 are all of the same arcuate length and are symmetrically distributed and spaced to provide spaces 29 of equal dimensions between the successive arcuate segments. The arcuate length of each of the spaces 29 is such as to be less than the diameter of a bearing ball 23 which is to be used and assembled in the bearing. The disposition of some of a set of bearing balls 23 with respect to their spaces 29 in the cage 15 is shown in FIGURE 2, where the balls 23 are held in the windows 31 of the separator by the arcuate segments 28 of the cage 15.

In the operation of assembling the ball bearing, a separator 24, which is to be assembled in the bearing, is seated loosely on the floor of the base 27 of the cup or cage 15, substantially co-axially with respect to the cup. The bearing balls 23 are then placed in position with suitable means, such as small tweezers, to position one ball 23 in each of the arcuate spaces 29 in the cup rim and against a corresponding window 31 in the separator 24. The diameter of each ball 23 is smaller than the height and width of each window 31. The diameter of the separator is such that the separator will engage the bearing balls 23 on a pitch line that is radially inward from the equatorial pitch line of the assembled balls. Consequently, the balls are retained in position between the separator and the arcuate sections 28 of the cup rim, as shown in FIGS. 2 and 3, by centrifugal pressure of the separator.

Because of the small mass and inertia of each of the bearing balls, and because of the resiliency of the separator, it is desirable to further retain the balls against possible displacement during manipulation of the outer race 25 in the assembling operation over the balls. For that purpose, the upper or top cup or cage 18 is moved down as in FIG. 4, and is placed in position on top of the lower cup 15, and the two cups co-operate to hold the bearing balls 23 positively against displacement from the separator 24, as in FIG. 5, in spite of distortion of the separator during such manipulation in applying the outer race 25 over the balls.

Figure 5:
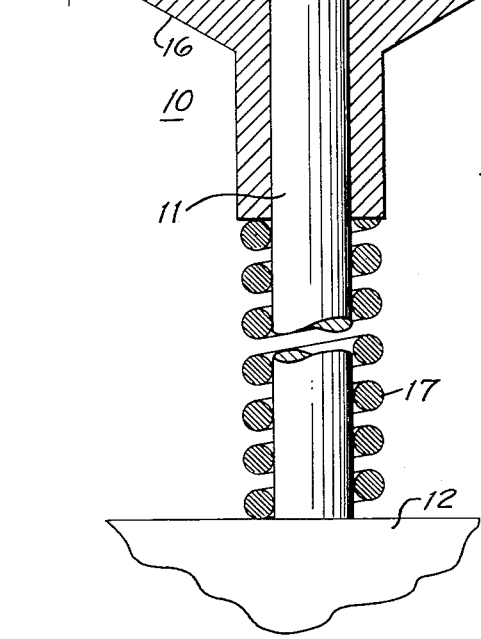
FIGURE 5 is a view similar to that in FIG. 1 with the cage closed around a separator and balls, and with the outer race in applied position around the bearing balls, and ready to remove the assemblage of the separator and the balls, and with the guard or catcher of the jig in depressed or lowered position, to permit the outer race to assume its assembled position around the balls.

The outer race 25 may now be applied and fitted over the bearing balls 23, as in FIG. 5, to assemble the separator ring 24 and the bearing balls 23 and the outer race 25 as a unit assemblage, to permit handling of such assemblage for wrapping, storage, or application onto an inner race or shaft.

In the assembling operation, the outer race 25 is lowered down over the handle 19 of the top cup 18, as in FIG. 1, and is moved into a tilted position as indicated in dash line in FIG. 2, to engage one of the bearing balls 23—33 extending out through the side walls formed by two arcuate sections 34 and 35 of one of the cups 15 and 18. The race 25 is then pressed radially inward sufficiently to slightly distort the separator 24 radially inward, in order thus to enable the race 25 to more easily fit down over the next adjoining bearing ball 23 in the direction in which the outer race 25 is pressed down to fit over that ball. That radially inward pressing action of the outer race 25 is progressively continued as the race is pressed downward to force each of the balls in sequence into the raceway 36 in the outer race 25. Due to the resiliency of the separator, the outer race 25 may actually be pressed downward directly co-axially for quick application, without any harm to the bearing balls, as in FIG. 5.

As shown in FIG. 5, downward pressure of outer race 25, over the balls 23, moves the shell 16 downward against the helical spring 17, while the two cages 15 and 18 are held stationary and in place at the top of the standard 11. As indicated, the shell 16 is depressed through the distance 37 in FIG. 5, when the race 25 is applied.

After all of the balls have been pressed into the raceway 36, the race 25 and the separator 24 hold all of the bearing balls in position as in a rotary cage, and are now assembled into a self-sustaining unit, in which all of the elements interlock and hold each other together.

The upper cup or cage 18 may now be removed by its handle 19, and the assembled separator and the bearing balls 23 and the outer race 25 may be removed as a unit, to permit the next ring to be placed in the stationary cup or cage 15 for assembling the next bearing.

During the operation of moving the outer race 25 downwardly into position to encircle the bearing balls 28, the shell 16 has been readily moveable downward against the compression spring 17 to permit free adjusting movement of the outer race 25. Once the assembled unit, including the outer race and the bearing balls and the separator are removed, the shell 16 returns to its upper terminal position, as shown in FIGURE 1 of the drawings. Its function may now be more readily seen in that the upper conical saucer-like section 40 comes close and adjacent to the outer surface of the side wall arcuate segments 28, close enough to catch and hold any of the bearing balls 23, such as the ball 23—43 shown in dot and dash, in FIG. 1, in case they come out from the inner side of the cup or cage 15 to the outer side of the arcuate segments 28 during the placement of those balls. Because the balls are so small, with small inertia, slight movement of the separator ring 24 during the placement of one ball of one side of the ing is sufficient to displace a ball on the diametrically opposite side of the ring, if the positioning force of the first ball is excessive. Even though the ball may be kicked out of the cup under such conditions, the ball is nevertheless caught and held in the conical saucer 40, instead of falling out and becoming lost. It may then be easily replaced on the inner side of the arcuate sections 28 of the cage 15.

In FIG. 7 is shown how assemblage of outer race 25, separator 24 and the bearing balls 23 may be supported by any suitable structure 45, to receive a rotatable shaft 46 suitably machined or formed to embody a surface 47 to serve as the inner raceway for the bearing balls 23. This figure also illustrates how the separator 24 serves as an inner retainer to press the bearing balls 23 radially outward to hold them in the raceway in the outer race 25, while waiting for the shaft, as the inner race, to be axially inserted into the bearing.

As further shown in FIG. 7, the separator takes up a minimum of space, axially, between the two races. This feature is of special importance where other external conditions impose a particular design on the supporting structure for the bearing, so the separator space between the races, on one side of the bearing balls, becomes diminished.

In FIG. 8 is schematically shown, exaggerated, how side pressure on one ball distorts the separator enough to move with the ball radially inward while the outer race is being applied.

In FIG. 9 is shown the manner in which the window outer edges are rounded off to prevent scratching the bearing balls during operation, and to further reduce friction.

The construction of the bearing herein provides many advantages and features. The construction and disposition of the separator permits access to the components of the bearing assembly to permit thorough cleaning of those components. Such accessibility results from the construction and disposition of the separator, which does not encompass the bearing balls, but contacts them only at two or three points in a cylindrical plane defined coaxially through a pitch line arc. The sides of the bearing are thus open to permit such access, as distinguished from conventional separators that are essentially cages that encompass the balls along their side exposures and substantially close the space that separates the races along the sides of the bearing balls.

A particular advantage and feature of the bearing shown herein is that the separator of the type disclosed permits the use of more bearing balls, with consequent increased load rating for the small bearing.

Certain small conventional commercial bearings for precession axis application, with low friction torque requirements, have separators that permit the use of only six balls or less. The separator described herein permits the use of up to eight balls, even in such small bearing, and thereby makes possible an increase of twenty to twenty-five percent in load carrying capacity in the bearing.

Previous reference to the separator construction mentioned the characteristic of resiliency as essentially desirable. Although metal was mentioned, the separator is not limited to metal for its structure. Light weight metal does provide an advantage of strength in relation to weight, which is important in small bearings. The separator may be made of aluminum modified for strength, such as Dural, and can be cold anodized to decrease friction and wear. Such cold processing retains the shape and form of the separator and avoids introducing distortions.

Moreover, since the separator, as formed herein, consists of only one part, it may readily be plated, as with chromium or other desired metal, without risk of peeling, since no subsequent forming or fabrication will be necessary that would require bending or shaping, and no shipping of the separator would result since only light forces are employed for assembling. This is in contradistinction to the procedure required in conventional bearings, in which the ball cages, in half-sections, are provided with prongs or fingers, which must be bent into overlapping positions to close the cage around the balls to act as a separator.

What is claimed is:

1. A jig for assembling a portion of a ball bearing, including an outer race and a separator ring, the separator ring having a plurality of radially positioned openings therethrough adapted to receive and radially locate a plurality of balls, said jig comprising, a cage having a circular floor surrounded by a rim wall having a plurality of equally spaced window slots to locate a corresponding number of bearing balls in symmetrical spaced relation radially inside of the rim wall, with a segment of each ball extending radially beyond the outer peripheral circle of the rim wall, to permit the outer race of a bearing to be moved axially downward to encircle the rim wall and to engirdle the bearing balls; a substantially circular cup, having a plurality of radially positioned spaces through one end thereof in substantial radial alignment with the individual bearing balls, located adjacent one end of the separator ring, a substantially cylindrical standard, coaxial with the cup and fixedly attached thereto, supporting the cup, a shell of saucer shape encircling the cage and disposed at approximately the floor level of the cage to catch any bearing balls that might move out of the cage during placement for assembly in a bearing; said shell being slidably supported by the standard, and a second substantially cylindrical cup, having a plurality of radial spaces through one end thereof, aligned with the individual bearing balls, located near the end of the separator ring, opposite the first cup, and means reciprocally supporting the second cup, and resilient means for normally supporting the saucer shell in said ball-catching position until an outer race is applied to engirdle the balls, said resilient means permitting the saucer to retract out of said position in response to pressure by an applied outer race to enable the outer race to fully engirdle the bearing balls.

2. A bearing assembly jig, for use in assembling a portion of a ball bearing including an outer race, a tubular separator ring of circular cross-section, said jig comprising a standard, a lower half-cage co-axial with the standard for locating a predetermined number of bearing balls in symmetrically spaced positions around the portion of the final bearing to be assembled, when the separator ring of the bearing to be assembled is placed concentrically in the cage for assembly, said separator ring having a plurality of radially positioned windows therethrough in radial alignment with the individual balls, said lower half cage having a plurality of radially positioned segments integral therewith, directed toward the bearing balls, said segments forming a plurality of radially positioned spaces in nominal alignment with the individual bearing balls, said spaces being adapted to clear the bearing balls, an upper half-cage to be seated on the lower half-cage to prevent the bearing balls from being casually displaced from their spaced positions during assembly when an outer race of the portion of the bearing is applied to engirdle the bearing balls; the upper half-cage being co-axially aligned with the lower half-cage, said upper half-cage having a plurality of radially positioned segments integral therewith directed toward the lower half-cage, said segments forming a plurality of radially positioned spaces in nominal radial alignment with the individual bearing balls, said spaces being adapted to clear the bearing balls, the spaces through the upper and lower half-cages being adapted to receive and locate a row of bearing balls in spaced symmetrical relationship relative to one another, a substantially cylindrical member, co-axial with the upper half cage, reciprocally supporting the upper half cage, to enable the upper half-cage to be moved toward the lower half-cage, the standard co-axially aligned with the lower half cage being adapted to support the lower half cage, the cylindrical member and the standard having means formed therein, for guiding the two half-cages into proper co-axial alignment for ball-holding positions; a saucer shell resiliently supported by the standard co-axially therewith, adjacent the rim of the lower half-cage to catch any bearing balls that may fall out of the lower half-cage before the upper half-cage is applied, and spring means fitted to the standard, adapted to normally urge the saucer shell toward the lower half-cage.

3. An assembly jig for assembling a portion of a ball bearing, including an outer race, a thin-walled tubular separator ring of circular cross-section, said separator ring having a plurality of equally spaced radially positioned windows therethrough adapted to radially locate and space a plurality of balls, said jig comprising a standard; a lower half-cage supported on the top of the standard co-axially therewith, to receive and space a predetermined number of bearing balls to be assembled in a portion of a bearing; an upper half-cage adapted to be seated on the lower half-cage co-axially therewith, to prevent the balls from being displaced during assembly of a portion of a bearing, the radial width of each of the windows in the separator ring being less than the diameter of one of the balls; and a saucer-shaped shell surrounding the lower half-cage, said shell being co-axial with and slidably supported by the standard, and spring means surrounding the standard, adapted to force the shell toward the lower half cage, to catch any balls that may casually drop out of the lower half-cage during the preparatory operations for the assembly of a portion of a bearing.

4. An assembly jig for assembling a portion of a ball bearing, as in claim 3, comprising additionally, spring means co-axial with the shell, said spring means being adapted to normally urge the shell into an elevated position immediately adjacent the lower half-cage; said spring means being adapted to permit the shell to be depressed away from the elevated position of the cage, when an outer race of the portion of a ball bearing being assembled is moved down over the cage to engirdle the balls and be assembled thereon.

References Cited in the file of this patent

UNITED STATES PATENTS

| | | |
|---|---|---|
| 1,074,228 | Whitney | Sept. 30, 1913 |
| 1,401,680 | Dlesk | Dec. 27, 1921 |
| 1,456,787 | Dlesk | May 29, 1923 |
| 2,407,016 | Kalister | Sept. 3, 1946 |